(12) United States Patent
Cleenewerck

(10) Patent No.: US 7,700,146 B2
(45) Date of Patent: Apr. 20, 2010

(54) LOW-TRANS FOR CONFECTIONERY FAT COMPOSITIONS

(75) Inventor: Bernard Cleenewerck, Wachtebeke (BE)

(73) Assignee: Fuji Oil Company Limited (JP)

( * ) Notice: Subject to any disclaimer, the term of this patent is extended or adjusted under 35 U.S.C. 154(b) by 1059 days.

(21) Appl. No.: 10/562,616

(22) PCT Filed: Jun. 24, 2004

(86) PCT No.: PCT/BE2004/000092

§ 371 (c)(1),
(2), (4) Date: Dec. 23, 2005

(87) PCT Pub. No.: WO2004/112492

PCT Pub. Date: Dec. 29, 2004

(65) Prior Publication Data

US 2006/0172057 A1  Aug. 3, 2006

(30) Foreign Application Priority Data

Jun. 24, 2003 (EP) .................................. 03447171
Sep. 26, 2003 (WO) ..................... PCT/BE03/00162

(51) Int. Cl.
*A23D 9/02* (2006.01)

(52) U.S. Cl. ...................................... 426/607; 426/601

(58) Field of Classification Search .......... 426/601–608
See application file for complete search history.

(56) References Cited

U.S. PATENT DOCUMENTS

| | | | |
|---|---|---|---|
| 4,276,322 A | | 6/1981 | Padley et al. |
| 4,702,928 A | * | 10/1987 | Wieske et al. ............... 426/607 |
| 4,859,192 A | * | 8/1989 | DeLeo ......................... 439/92 |
| 5,786,019 A | | 7/1998 | Cain et al. |
| 6,277,433 B1 | * | 8/2001 | Lantz et al. ................. 426/606 |

FOREIGN PATENT DOCUMENTS

| | | |
|---|---|---|
| EP | 0 502 697 A1 | 9/1992 |
| EP | 1 040 761 A1 | 10/2000 |
| WO | WO 94/16572 * | 8/1994 |
| WO | WO 03/080779 A1 | 10/2003 |

OTHER PUBLICATIONS

Goh, E. M. 1985. JAOCS 62(4)730.*
Firestone, D. 1999. Physical and Chemical Characteristics of Oils, Fats and Waxes. AOCS Press, Champaign, Illinois, p. 71-72 & 98-99.*

* cited by examiner

*Primary Examiner*—Carolyn A Paden
(74) *Attorney, Agent, or Firm*—Scully, Scott, Murphy & Presser, P.C.

(57) ABSTRACT

The present invention relates to a process for the production of a fat composition suitable for use as a confectionery fat, wherein a starting fat composition which contains between 20 and 95 wt % of $S_2U$, less than 75 wt % of $SU_2+U_3$, less than 20 wt % of $S_3$ between 1 and 12 wt % of diglycerides, between 10 and 100 wt % of at least one interesterified fat, the interesterified fat containing less than 15 wt % of C-12 with respect to the total amount of interesterified fat, is subjected to a catalytic hydrogenation so as to obtain a first fat and in that the first fat is incorporated in the fat composition. Thereby the glyceride contents are expressed as wt % with respect to the total amount of d- and triglycerides, S means a saturated fatty acid with a hydrocarbon chain length of 14-24 carbon atoms, U means unsaturated fatty acid with a hydrocarbon chain length of 14-24 carbon atoms.

29 Claims, No Drawings

LOW-TRANS FOR CONFECTIONERY FAT COMPOSITIONS

The present invention relates to a process for producing a fat composition suitable for use as confectionery fat, as described in the preamble of the first claim.

The present invention also relates to the fat composition as such and to the use of the fat composition in several confectionery applications.

1. BACKGROUND OF THE INVENTION

1.1. Filling Fats and Cream Fats

A first important application area of confectionery fats is the so-called filling and cream fats. Filling and cream fats are used for the production of for example soft centres for pralines or confectionery bars or for creams used in or on biscuits or wafers. To be suitable for use as a cream and/or filling fat, it is important that the fat has specific properties such as good melting properties in the mouth, good creaminess as well as a stable crystal structure. Several types of fats capable of providing these properties are known in the art.

A first class of fats suitable for use as filling and/or cream fats includes the so-called lauric fats. The lauric fats are derived from coconut oil or palm kernel oil and contain a high amount of lauric and myristic acid. By subjecting these lauric fats to a fractionation and/or a hydrogenation reaction, a lauric fat with a steep SFC-profile can be obtained, i.e. a lauric fat of which the solid fat content (SFC) as a function of temperature is high at room temperature, whereas at body temperature the solid fat content is low and the fat is completely molten. This sharp transition from solid to liquid gives a cool sensation in the mouth. Besides showing a steep SFC-profile, lauric fats show a quick solidification, which is an advantage when used in fillings and creams. Although they are frequently applied in practise, lauric type fats have a number of disadvantages, a major disadvantage being the risk to saponification of the lauric acid upon ageing, involving the occurrence of a bad taste. Another disadvantage of lauric fats is their high saturated fatty acid content, often over 80%, which is considered an important nutritional disadvantage.

A second class of cool melting filling and cream fats is based on fractionated palm oil. Palm oil as such shows a rather flat SFC-curve with a SFC at 20° C. of only 25%, while at 35° C. the SFC is 6%. By subjecting palm oil to a fractionation process a product with steeper SFC-profile can be obtained. Fractionation of palm oil is carried out by cooling palm oil to a certain temperature, until a liquid phase is obtained containing triglycerides with a lower melting point, and a solid phase containing triglycerides with a higher melting point. Reduction of the tailing effect of the SFC curve is achieved by removing the high melting part, which mainly consists of trisaturated triglycerides like tripalmitine. Fats associated with this tailing cause a waxy feeling in the mouth upon eating. In a next stage, through removal of the part with the lower melting temperature, which mainly comprises tri- or di-unsaturated triglycerides like tri-oleine or 1-palmitic 2-3-oleic triglycerides, the SFC at room temperature is increased. The fraction remaining after removal of the higher and lower melting part of the palm oil is commonly indicated by the name PMF (palm mid fraction).

The most important advantages of PMF-based filling and cream fats are their non-lauric nature, the lower content of saturated fatty acids, the fresh melting sensation upon eating and the fact that PMF is a non-hydrogenated fat. A major disadvantage of PMF however resides in the rather long and laborious fractionation process involved, together with the rather low production yields, which renders the product expensive: starting from palm oil with most fractionation processes, only 25-30% of PMF is obtained. The yields of hard PMF obtained via double fractionation are even lower. A further disadvantage is the slow solidification rate of PMF, which necessitates in the confectionery plant the use of devices with high cooling capacities. Besides this, PMF based fats show a risk to re-crystallisation, causing "graininess" of the final product when stored for some time, in particular in case no tempering is applied.

A third type of filling and cream fats is based on hydrogenated liquid oils or hydrogenated olein fractions. This type of fat compositions is characterised by a good creaminess and good melting properties, although they may show less cooling sensation in the mouth, which is typical for the two previous types of fat compositions. Products containing these fats show a quick solidification and a stable texture. In addition to this, hydrogenated liquid oils and olein fractions are less expensive compared to the former products since their raw materials are largely available and their processing is less complicated as compared to fractionation of palm oil.

Hydrogenated liquid oils or olein fractions contain trans fatty acids which increase the crystallisation rate of the fat composition containing them. However the often too high trans fatty acids content of hydrogenated liquid oils and olein fractions, has become a health concern, the importance of which is increasing. Although trans fatty acids are unsaturated fatty acids, they have undesirable effects comparable to or even worse than saturated fatty acids (SFA). As a consequence, there is an interest to not only control the SFA level of a fat composition, but to control also the sum of the TFA and SFA levels. If it is envisaged to obtain products with steep SFC-profiles, the hydrogenation reaction is mostly carried out in the presence of a trans-specific catalyst, for example S-poisoned Ni-catalysts.

From the above, it will become clear that there is a need to a fat composition suitable for use as a confectionery fat and to a method for producing such a fat composition. In particular there is a need to a fat composition which preferably is non-lauric, which is characterised by a good melting in the mouth without involving waxiness, which shows a sufficiently high crystallisation rate and has an interesting nutritional profile, which means that the composition should have a low content of both saturated and trans fatty acids. Furthermore it is of importance that the fat composition shows a low risk to for instance re-crystallisation or fat blooming when used in combination with enrobed chocolate.

From EP-A-547.651 it is known to use in filling fats a blend of (i) a non lauric fat, in particular a mid-fraction obtained from wet fractionation of hardened soybean oil containing fat mixtures; and (ii) a liquid, trans-hardened high stability oil, in particular olein fractions obtainable from wet fractionation of hardened soybean oil containing fat mixtures. Thereto, combinations of soybeanoil and palm oil olein are subjected to a trans-selective hydrogenation reaction. In the wet fractionation preferably aceton is used as a solvent, for the trans-selective hydrogenation a sulphided Ni-catalyst is found very suitable. The blends of mid-fractions and olein-fractions of such trans-hydrogenated combinations give filling fats with a minimised waxiness, a steep melting curve and, a steep SFC-profile with N20>40% and N30<8%, and good mouthfeel. However, the trans fatty acid content of these fat composition ranges from 35 to 45%, which is too high.

According to Petrauskaite et Al discussed in The Journal of American Oil Chemists' Society (vol 75; Nr 4, 1998) confectionery fats, which are free of trans fatty acid may be obtained by subjecting a blend of fully hydrogenated soybean oil with soybean oil to an interesferification reaction. However, the thus obtained fats have a flat SFC-profile. As a consequence these fats are either soft at room temperature and combined with an acceptable solid fat content at body temperature, or in case the content of fully hydrogenated fat is higher, they are harder at room temperature, but in that case the solid fat content at body temperature is high as well, causing a bad mouthfeel, often described as waxyness.

Patent application PCT/BE02/00045 discloses a process for the production of a fat composition suitable for use as confectionery fat in confectionery fillings and creams, showing a steep SFC profile but simultaneously having a low trans fatty acid content. According to the process of PCT/BE02/00045, a fat composition containing palm oil or a palm oil fraction, and having a specific composition in terms of triglyceride and diglyceride content, is subjected to a catalytic hydrogenation, with the aim of obtaining a first fat the trans and saturated fatty acid content of which is increased to only a limited extent upon hydrogenation. The thus obtained first fat is incorporated in a fat composition. By combining the first fat with a second fat with low trans fatty acid content, a fat for example a soft palm fraction or a liquid oil, a fat composition is obtained which is suitable for the production of confectionery creams showing a good mouth feel and virtually no graininess.

1.2. Coating Fats and Hard Centre Fats

Besides the above discussed use of confectionery fats in fillings and creams, confectionery fats of a harder type which include the so-called hardbutters, know a second important application area, in hard centres and in confectionery coatings and tablets. Hard centres is understood to designate confectionery centres with a firm texture, that are usually produced by extrusion. Hard butters are characterised by a steep SFC-profile: they have a high solid fat content and are hard at room temperature. At body temperature the hard butters melt and their solid fat content becomes negligible. These confectionery fats have a SFC profile that is similar to that of cocoa butter, which is the traditional chocolate fat.

Over the years, three main classes of hard butters have been developed for use in coatings or tablets including (i) lauric cocoa butter substitutes, (ii) cocoa butter equivalents (CBE) containing palm oil fractions combined with so-called wild fats like illipe or shea fat, and (iii) non-lauric cocoa butter replacers (NL-CBR) based on trans-specific hydrogenated liquid oils or liquid fractions. These three classes of cocoa butter alternatives correspond to the three classes of filling fats described above.

In general fillings and creams will be softer than tablets and coatings. The reasons for the higher softness of fillings and creams resides in both the higher fat content of these products as compared to tablets and coatings as well as in the softer nature of the fats contained therein, which have a lower SFC at room temperature. Both for filling and cream fats and for coating fats it is important to have a steep SFC-profile, which means that at room temperature the SFC should be sufficiently high, whereas at body temperature the SFC should be low, in order to avoid a "waxy" mouth feel. This explains the similar approach used in the production of filling/cream fats and the so-called hard butters.

Palm fractions used in the production of CBE are typically obtained by wet fractionation, which gives a PMF of better quality as compared to PMF obtained from dry or detergent fractionation, the wet fractionation process however being the more expensive one. The wet fractionation process guarantees a sharp fractionation, with an efficient removal of low melting triglycerides like POO (P=Palmitic acid; O=Oleic acid) and high melting triglycerides like PPP. The wet fractionation is also an efficient process for removing diglycerides from the palm mid fraction, which are to be avoided in CBE products. It is important to mention here that CBEs differ from non-lauric CBR and lauric cocoa butter substitutes in that they are a tempering type of fat, similar to natural cocoa butter. Tempering is a process step in which a molten chocolate mixture is subjected to a temperature conditioning process. In particular, in the tempering step the molten chocolate mixture is subjected to a process involving repeated cooling and heating steps, with the aim of stimulating and maximising crystallisation of the fat in a stable crystalline form.

The production of non-lauric CBR is described by W. Soon in "Specialty fats versus Cocoa Butter" page 189-192. According to W. Soon, liquid oils like soybean oil, rapeseed oil and sunflower oil are suitable raw materials for a hydrogenation process, as well as liquid fractions like highly fractionated palm olein with an iodine value above 68. However, according to W. Soon, care needs to be taken to carry out the hydrogenation process in such a way that production of trisaturated triglycerides (SSS where S=Saturated) fatty acid is minimised, as these have a high melting point and induce waxiness. This result may be achieved through an appropriate selection of the hydrogenation catalyst. In particular, W. Soon advises to carry out the hydrogenation reaction in the presence of a sulphur poisoned nickel catalyst as this promotes the formation of trans-isomers, which give a steep SFC-profile, formation of SSS isomers being minimised. When producing a palm oil based non-lauric CBR, it is advisable to use as a starting material a palm olein the PPP and PPO/POP content of which is as low as possible. PPP is a trisaturated fatty acid naturally present in palm oil. With PPO and POP saturation of one single fatty acid suffices to build trisaturated fatty acids.

The effect of using a trans specific sulphur poisoned Ni-catalyst in a hydrogenation reaction of palm olein in stead of a traditional non trans specific Ni-catalyst on palm olein has been described by H. Mori in "Crystallisation and polymorphism of fats and fatty acids" pg 430-431. According to Mori with a trans specific catalyst, a confectionary fat with a sharp melting curve is obtained, which is not the case when using conventional hydrogenation catalyst.

U.S. Pat. No. 4,205,095 relates to a method for the production of cocoa butter substitutes, according to which a palm mid fraction is subjected to a catalytic hydrogenation reaction in the presence of a nickel, platinum or palladium catalyst. The purpose of the hydrogenation reaction is to extend the possibilities of blending PMF with cacao butter by removing triglycerides containing more than one unsaturated fatty acid ($SU_2$ and $U_3$) as much as possible and by converting polyunsaturated fatty acids into mono-unsaturated fatty acids, thereby reducing the iodine value to 38-45, the linoleic acid content to below 2% and achieving a fat composition with a melting point of between 33-36° C. The cocoa butter substitutes disclosed in U.S. Pat. No. 4,205,095 are meant to be used in chocolate products like tablets or coatings.

From U.S. Pat. No. 3,686,240 a process is known for producing a vegetable fat product suitable for replacing at least part of cocoa butter in chocolate, the properties of the vegetable fat product being similar to those of cocoa butter. Thereto a palm oil middle melting point fraction (PMF) is subjected to a hardening process through hydrogenation, with the aim of producing a fat which upon blending with natural cocoa butter shows full compatibility with cocoa butter, does not soften or does not get a lower melting point. The full compatibility with cocoa butter implies that the product obtained with this process is a tempering type of fat. It is further explained that the palm mid fraction should be prepared by solvent fractionation using a specific solvent.

EP-A-0.536.824 solves the problem of providing a non-temper confectionery fat composition which is free of trans fatty acids. The composition consists of a (i) first fat which is a double fractionated palm mid fraction obtained by wet fraction, which contains more than 70 wt % POP triglycerides and is capable of crystallising in the Beta crystal form; and (ii) a second fat, capable of stabilising Beta prime crystals and comprising triglycerides of the SSO and/or S3-type. An example of the second fat is a PPO-rich fat obtained by enzymatic interesterification, having a PPO content of 65.5 wt. %. As the fat composition of EP-A-0.536.824 does not contain trans fatty acids, the fat composition cannot have been subjected to a partial hydrogenation.

The fat composition of EP-A-536.824 is a non-temper type, which follows from the comparison of the SFC-values at 30° C. of the fat composition which has not been subjected to a stabilisation process, with a fat composition that has been subjected to a stabilisation (tempering) step. It is claimed that the ratio of both SFC values should be below 4, preferably below 3, the examples giving fat compositions of which the SFC ratio ranges from 1.7 to 3.2. The application of these fat compositions in confectionery coating recipes containing no cocoa mass, having a cocoabutter/fat blend ratio of 5/95 is demonstrated. In the preparation of the fat compositions of EP 0 536 824, no hydrogenation step is involved.

The fat composition obtainable with the process of PCT/BE02/00045, which is low in trans fatty acids, proofed to be very suitable for use in for example hard centres and confectionery coatings and tablets.

1.3. Caramel

A third application of fats in the confectionery area is their use in caramel. Caramel is understood to include both high boiling and soft caramels. Fats give a certain consistency to the caramel, they control chewiness and reduce stickiness. In caramels, traditionally hydrogenated liquid oils such as hydrogenated soybean oil or hydrogenated rapeseed oil are used. In stead of these oils, lauric fats like hydrogenated palm kernel or hydrogenated coconut oil can be used as well. Because of the too high content of trans fatty acids or saturated fatty acids of the conventionally used hydrogenated oils, there is a need for alternatives having a low trans fatty acid content, which show a melting profile similar to the conventionally used oils and which may be produced at an acceptable cost for this application.

The process of PCT/BE02/00045 proofed to be suitable for the production of fats for use in caramels.

2. OBJECT OF THE INVENTION

It is an object of the present invention to provide a fat composition for use as a confectionery fat, which is characterised by a steep SFC-profile, which has an Interesting nutritional profile, i.e. has a low content of trans fatty acids and a sufficiently low content of saturated fatty acids, a high crystallisation rate and which shows a reduced tendency to re-crystallisation or fat blooming. In particular, it is an object of the present invention to provide a vegetable fat composition showing the afore mentioned properties.

Another object of this invention is to provide a fat composition which is suitable for use in fillings and in creams, and also in caramel with the aim of replacing therein fats containing high levels of trans fatty acids or saturated fatty acids.

It is a further object of the present invention to provide a fat composition which is suitable for use in confectionery centres, confectionery coatings and tablets, the fat composition being suitable to fully or partially replace fats with a high trans fatty acid content, while maintaining a steep SFC-profile, whereby the confectionery product can be prepared without necessitating a tempering step.

3. DESCRIPTION OF THE INVENTION

It has now been found with the present invention that a fat composition suitable for use as confectionery fat can be obtained by subjecting a starting fat composition to a catalytic hydrogenation reaction as described in the characterising part of the first claim.

Thereto, according to the present invention, a starting fat composition which contains
- between 20 and 95 wt. % of $S_2U$
- less than 75 wt. % of $SU_2+U_3$
- less than 20 wt. % of $S_3$
- between 1 and 12 wt. % of diglycerides,
- which starting fat composition further contains between 10 and 100 wt. % of at least one interesterified fat, the interesterified fat containing less than 15 wt. % of C-12 with respect to the total amount of interesterified fat, is subjected to a catalytic hydrogenation so as to obtain a first fat and in that the first fat is incorporated in the fat composition. In the above, the glyceride contents are expressed as wt. % with respect to the total amount of di- and triglycerides, in which S means a saturated fatty acid with a hydrocarbon chain length of 14-24 carbon atoms, U means unsaturated fatty acid with a hydrocarbon chain length of 14-24 carbon atoms.

According to a preferred embodiment, the starting fat composition contains between 20-80 wt. %, preferably between 30-70 wt. % of at least one interesterified fat.

According to a second preferred embodiment the starting fat composition which contains an amount of at least one interesterified fat is subjected to a partial hydrogenation. As a result of the partial hydrogenation fat compositions may be obtained which have a steeper SFC-profile, which are sufficiently hard at room temperature, which have an acceptable SFC content at body temperature so that there is a minimum risk to the occurrence of waxiness. The fats obtainable with the present invention have an improved crystallisation rate, which is important as it determines the capacity of confectionery production lines and the energy needed to cool down and solidify end products before being packed. The fats obtainable with the present invention can thus be distinguished from fats obtainable with the known processes, in that they are first subjected to an interesterification reaction, and only thereafter to a hydrogenation reaction, a partial hydrogenation being preferred, although if so desired, the fat may also be fully hydrogenated.

According to another preferred embodiment, the starting fat composition is subjected to a catalytic hydrogenation until a hydrogenated first fat is obtained which is characterised by a trans fatty acid (TFA) content of less than 25 wt. %, preferably less than 20 wt. %, more preferably less than 10 wt. % with respect to the total fat content of the composition.

According to a further preferred embodiment of this invention (1) the starting fat composition has the following triglyceride composition:
A $S_2U$ content which is at least 30 wt. %, preferably at least 40 wt. %, more preferably at least 45 wt. %, A $S_2U$ content which is less than 95 wt. %, preferably less than 85 wt. %, preferably less than 80 wt. %, more preferably less than 70 wt. %, most preferably less than 65 wt. %, A $SU_2+U_3$ content of below 60 wt. %, preferably between 10 and 50 wt. %, more preferably between 20 and 40 wt. %, A $S_3$ content of below 20 wt. %, preferably less than 15 wt. %, more preferably less than 10 wt. %

(2) the starting fat composition has a diglyceride content between 3 and 12 wt. %.

The starting fat composition is preferably a vegetable fat composition, in order to provide a vegetable fat composition. The starting fat composition preferably comprises palm oil or a fraction thereof. The starting fat composition may if so desired however also comprise other fats. The starting fat composition may be composed of a single fat or a blend of two or more different fats.

The above described fat compositions can often be prepared starting from a fat which does not require extensive and expensive fractionation processes to render it suitable for use in the above mentioned applications. However, if it is envisaged to use a starting fat composition with a specific triglyceride composition, the starting fat composition may be the result of a fat that has been subjected to one or more fractionation steps.

The inventor has now found that the incorporation in the starting fat composition of an amount of interesterified fat and the subjecting of this starting fat composition to a hydrogenation reaction, results in a fat having an improved resistance against fat bloom and re-crystallisation, while all other desirable properties, i.e. the presence of a steep SFC-profile, an interesting nutritional profile, i.e. a low content of trans fatty acids and a sufficiently low content of saturated fatty acids as well as a high crystallisation rate, are maintained.

The inventor has found that by incorporation of the fat composition obtainable with the process of this invention in the above described products, storage stability and shelf life may even be improved. Indeed, certain re-crystallisation and fat bloom phenomena can be retarded by several weeks or months, meaning an increased value for the final end product.

Another advantage of the current invention is that a higher amount of the low-trans first fat can be incorporated in the final fat composition as compared to the composition disclosed in PCT/BE02/00045, while maintaining the desired properties, thus improving the economic feasibility of the fat composition of this invention.

A number of applications exist where the risk to the occurrence of fat re-crystallisation and bloom is rather high. This is mostly the case in recipes using a higher amount of cocoabutter where the composition is not tempered and risks to re-crystallise, for example in confectionery coatings containing some cocoa mass besides defatted cocoa powder. The cocoa mass is added in order to increase the chocolate taste. This is also the case in recipes containing a higher amount of liquid oil where there is a risk to fat migration and re-crystallisation. An example of such recipe is a confectionery filling containing a high amount of nut paste, which contain a high amount of free liquid oil. The liquid oil acts as a transport medium for other fat components to migrate to the surface, where re-crystallisation can take place and visible crystals or crystals are formed, which during tasting are evaluated as a kind of graininess.

The interesterified fat may be a single fat or a mixture of two or more interesterified fats.

In the present invention it is preferred to use an interesterified fat with a C-12 content of less than 10 wt. %, preferably less than 7 wt. %, more preferably less than 3 wt. %, most preferably less than 1.5 wt. %. This means that it is preferred to use a non-lauric interesterified fat, in view of reducing the risk to the development of so-called soapy flavour. This is also done to reduce the risk to the occurrence of eutectic effects when using the fat composition in combination with non-lauric fats, in particular in applications having a hard texture, for instance tablets or coatings.

Suitable interesterified fats for use in the starting fat of the present invention are fats containing palm or palm fractions. Examples of suitable fats include interesterified palm, interesterified palm stearin or olein, or mixtures containing two or more of these products. These fats are non-lauric and their raw materials are widely available. Furthermore, as these fats contain an interesting amount of solid fat, the extent to which the starting fat needs to be hydrogenated to obtain the desired SFC-profile may be limited, as a consequence of which the risk to the building of trans fatty acids is limited. Suitable fats for use in the starting fat of the present invention include fats obtained from a random chemical interesterification or from an enzymatic interesterification. The person skilled in the art will be capable of selecting the appropriate nature of the interesterified fat depending on the envisaged triglyceride composition.

When it is desired to increase the sharpness of the SFC-profile and to further improve the mouth feel of the product, the first fat may be subjected to a further fractionation, after the hydrogenation reaction has been terminated. This can be particularly useful when producing fats for application in coatings and tablets, as fractionation allows increasing snap and reducing waxiness.

In a preferred embodiment of the process for producing a fat with a sharp or steeper SFC-profile and a particularly low TFA-content, use is made of a starting fat composition containing an amount of a fractionated interesterified fat, in particular a fat that has been fractionated after interesterification. The amount of this fractionated fat incorporated into the starting fat composition will mostly range from 10 to 100 wt. % expressed on the total amount of interesterified fat present in the starting fat composition.

In the process of this invention, the hydrogenation is carried out in such a way that the first fat obtained after hydrogenation contains less than 8 wt. %, preferably less than 6.5 wt. %, most preferably less than 5 wt. % of trans fatty acids.

In the process of this invention the first fat can be mixed with at least one second fat having a sharp SFC profile and a low trans fatty acid (TFA) content, so as to obtain a fat composition with a TFA-content of less than 8 wt. %, preferably less than 6.5 wt. %, most preferably less than 5 wt. %. The second fat can for instance be a fat prepared according to PCT/BE02/00045. It was found that the thus obtained fat compositions show a steep SFC-profile which is particularly useful for confectionery coatings, a low TFA-content and a very good stability without necessitating tempering. These fat compositions can be obtained without necessitating the use of a highly fractionated and expensive fat composition containing over 70 wt. % of POP in view of providing the desired SFC profile. It is however also possible to use as a second fat, a blend of two or more different fats.

The first fat obtainable with the process of this invention is preferably characterised by an SFC at 20° C. of at least 35 wt. %, preferably at least 50 wt. %, most preferably at least 60 wt. %. High SFC's at 20° C. are particularly desirable when using the first fat as such in tablets or coatings but also in fillings or creams containing a high amount of liquid oil where it is preferred that the first fat has a sufficiently high solid fat content so as to obtain a filling having a sufficiently hard texture.

The first fat is preferably a non temper fat. When using this fat either pure, in combination with other non-temper fats or in combination with a limited amount of temper type fat, stable products can be made without necessitating a tempering step in the manufacturing process, which is an important simplification.

An additional advantage of the fats obtainable with the present invention is their high crystallisation rate. This is an important parameter since it is linked to the capacity of confectionery production lines and the energy needed to cool down and solidify the products before being packed. Fat compositions obtainable with this process are characterised by a crystallisation time at 15° C. of less than 15', preferably less than 10' to reach 50% of the SFC measured at 15° C. according to IUPAC method 2.150a.

In view of the envisaged properties of the end product, the fat composition obtainable with the above described method may exclusively contain the first fat, or in other words containing 100 wt. % of the first fat. However, the person skilled in the art may as well blend the first fat with an amount of a second fat. Thereto, in the process of this invention or the product obtainable with that process, 10-100 wt. % of the first fat may be blended with 90-0 wt. % of a second fat. The second fat preferably has a C-12 content of less than 5 wt. %, most preferably less than 3 wt. %. To limit this C-12 content, the second fat is preferably substantially free of lauric components.

The second fat preferably contains an amount of a hydrogenated fat or an interesterified fat as these will generally show a good compatibility with the first fat.

To limit the trans fatty acid content of the final fat composition when using a mixture of the first fat with a second fat, it is preferred to use as a second fat a fat having a limited trans fatty acid content. In particular it is preferred that the second fat contains less than 15 wt. %, preferably less than 10 wt. %, most preferably less than 7.5 wt. % of trans fatty acids.

Very suitable fats for use as second fat are fats containing 70 wt. % or more of palm oil or palm oil fractions, or a mixture thereof. Examples of such fats are hydrogenated palm or hydrogenated palm olein, interesterified palm, interesterified palm oil fractions, which may be further fractionated after interesterification or hydrogenation or not, as these are fats with sufficient solid parts to give enough structure to the final fat composition, without giving high trans fatty acid levels.

The present invention also relates to a fat composition obtainable with the above described process, to the use of the fat compositions obtainable with the above described process, and the use of the above described fat compositions in the preparation of confectionery products.

The invention also relates to a food product, preferably confectionery products containing the fat composition obtainable with the above described process, or containing a fat composition as described above. In particular it concerns confectionery products belonging to the group of fillings, creams, hard centres or caramel, or products like confectionery coatings or tablets.

The present invention is further elucidated in the examples and comparative examples given below.

EXAMPLES

Comparative Example A

A palm oil was dry fractionated so as to obtain a palm mid fraction (PMF) with an IV of 42. Other characteristics of this PMF are given in table 1. The thus obtained PMF was subjected to a catalytic hydrogenation, in the presence of a Ni catalyst type Pricat 9910 until a product was obtained with the characteristics of sample 1 summarised in table 1.

TABLE 1

| Product | PMF | Sample 1 |
|---|---|---|
| IV | 42.0 | 38.6 |
| FAC | | |
| C12 | 0.26 | 0.28 |
| C14 | 1.01 | 1.05 |
| C16 | 50.25 | 50.23 |
| C18 | 5.14 | 5.66 |
| C18-1 | 37.19 | 40.19 |
| C18-2 | 5.11 | 1.86 |
| C18-3 | 0.00 | 0.00 |
| C20 | 0.43 | 0.37 |
| TFA | 0.71 | 7.71 |
| SFA | 57.21 | 57.71 |
| TFA + SFA | 57.92 | 65.42 |
| Triglycerides | | |
| S2U | 69.51 | |
| SU2 + U3 | 18.57 | |
| S3 | 1.29 | |
| Diglycerides | 8.85 | |
| SFC | | |
| 10° C. | 76.9 | 88.9 |
| 20° C. | 46.5 | 71.1 |
| 25° C. | 8.4 | 49.1 |
| 30° C. | 0.0 | 25.3 |
| 35° C. | 0.0 | 11.3 |

Example 1

A fat composition was prepared by
(1) In a first step, mixing 60 wt. % of a PMF of comparative example A with 40 wt. % of random interesterified palm
(2) followed by a second step of subjecting this mixture to a catalytic hydrogenation, using a catalyst type Pricat 9910 (available from Synetix), a non-trans specific Ni catalyst.

The hydrogenation was continued until a product was obtained having the characteristics given in table 2, sample 2. The characteristics of the composition before hydrogenation are given in table 2 as Initial Fat Composition.

The Initial Fat Composition was too soft to be fit for use in confectionery coatings or filling recipes containing high amounts of liquid oil, and had a too slow crystallisation rate. As will become apparent from the examples given below, the problem of the too slow crystallisation rate can be overcome by subjecting the Initial Fat Composition to a slight hydrogenation, during which only a limited amount of TFA is built and the amount of saturated fatty acids is increased to only a minor extent. A particular advantage of the Initial Fat Composition is that it does not require the use of expensive fractionation processes, e.g. wet fractionation to render it suitable for use in confectionery products.

TABLE 2

| Product | Initial Fat Composition | Sample 2 | Sample 3 |
|---|---|---|---|
| IV | 46.6 | 40.2 | 43.4 |
| FAC | | | |
| C12 | 0.48 | 0.55 | 0.32 |
| C14 | 1.24 | 1.34 | 1.03 |
| C16 | 49.35 | 50.30 | 43.04 |
| C18 | 4.49 | 4.89 | 6.07 |
| C18-1 | 36.09 | 40.95 | 47.53 |
| C18-2 | 7.41 | 1.13 | 1.09 |
| C18-3 | 0.03 | 0.00 | 0 |
| C 20 | 0.39 | 0.28 | 0.38 |
| TFA | 0.94 | 8.38 | 14.51 |
| SFA | 56.06 | 57.47 | 50.94 |
| TFA + SFA | 57.0 | 65.85 | 65.45 |
| Triglycerides | | | |
| S2U | 56.58 | | |
| SU2 + U3 | 29.59 | | |
| S3 | 4.92 | | |
| Diglycerides | 8.58 | | |
| SFC | | | |
| 10° C. | 69.0 | 87.5 | 86.0 |
| 20° C. | 39.3 | 65.4 | 62.8 |
| 25° C. | 18.2 | 45.9 | 46.3 |
| 30° C. | 8.2 | 27.1 | 29.7 |
| 35° C. | 3.5 | 14.3 | 16.6 |
| Crystallisation rate at 15° C. (*) | | | |
| 2.5 minutes | 18.50% | 30.10% | 42.50% |
| 5 minutes | 20.40% | 47.30% | 61.80% |
| 7.5 minutes | 21.10% | 60.10% | 71.10% |
| 10 minutes | 23.60% | 68.70% | 75.90% |
| 15 minutes | 36% | 79.10% | 81.80% |

(*) SFC measured after a certain crystallisation time expressed as % of the SFC at 15° C. measured according to IUPAC method 2.150a. The starting fat is completely molten at 80° C. and is then put in a water bath at 15° C. From there on time registration starts.

Example 2

A sample (sample 3) was prepared by blending 50 wt. % of a first fat, obtained by hydrogenating the Initial Fat Composition of Example 1, with a catalyst type Pricat 9910 to an IV of 39.1, with 50 wt. % of a second fat.

The second fat was obtained by hydrogenating a single fractionated palm olein, with an IV value of 56.6 in the presence of a catalyst type Pricat 9910, until a product was obtained with an IV of 48.1.

The characteristics of sample 3 are given in table 2.

Example 3

Confectionery coatings were prepared using the fat composition of respectively comparative sample 1, and sample 2 and sample 3 according to the invention.

The recipe used for preparing these coatings is summarised in table 3. The coatings were prepared by first melting the fat composition of the comparative example, sample 2 or sample 3 and adding 1 wt. % of sorbitan tristearate. All ingredients, except part of the fat, were mixed and roll refined. After roll refining the mixed ingredients were further homogenised with the rest of the fat in a mixer with heated jacket at a temperature of 40° C.

TABLE 3

| Coating Recipe | % |
|---|---|
| Fat | 29.2 |
| Sugar | 44.7 |
| Cocoapowder 10/12 | 20.6 |
| Cocoa Mass | 5.1 |
| Lecithine | 0.4 |
| Vanilline | 0.05 |
| Cocoa butter on total fat | 14.8 |

With this coating mixture, tablets were moulded at a temperature of 45° C., whereafter the tablets were cooled for 30' at 5° C. and thereafter for 30' at 15° C., following which the tablets were de-moulded. No tempering was applied. The tablets were stored in an incubator for 1 week at 20° C.

The bloom resistance of the tablets was tested by storing in incubators at different temperatures. Thereto, a first incubator was cycled in cycles of 12 hours between a temperature of respectively 15-25° C., a second incubator was left at a temperature of 25° C., a third one was maintained at a constant temperature of 28° C.

The results of these bloom tests are given in table 4. Scores are given from "no", indicating "no bloom" to "++++", indicating very "strong blooming"

From the results given in table 4 it can be seen that coatings containing an important amount of cocoa-butter, tend to bloom earlier when containing a fat composition of the type of sample 1 as compared to fats of samples 2 and 3. Samples 2 and 3 are both fats which contain an amount of an interesterified fat and are produced according to the process of the present invention, with the objective of improving bloom resistance.

TABLE 4

| | 15-25° C. | | | 25° C. | | | 28° C. | | |
|---|---|---|---|---|---|---|---|---|---|
| Weeks | sample 1 | sample 2 | sample 3 | sample 1 | sample 2 | sample 3 | sample 1 | sample 2 | sample 3 |
| 1 | no | no | no | no | no | no | no | no | no |
| 2 | +/− | no | no | +/− | no | no | +/− | no | no |
| 3 | ++ | + | +/− | + | no | no | +/− | no | no |
| 4 | ++ | + | + | ++ | no | no | + | no | no |
| 5 | ++ | + | + | ++ | no | no | + | no | no |
| 6 | +++ | ++ | ++ | +++ | no | no | ++ | no | no |
| 7 | +++ | ++ | ++ | +++ | no | no | ++ | no | no |
| 8 | +++ | ++ | +++ | +++ | no | no | ++ | no | no |
| 9 | +++ | ++ | +++ | +++ | no | no | ++ | no | no |
| 10 | +++ | ++ | +++ | +++ | no | no | ++ | no | no |
| 12 | +++ | ++ | +++ | +++ | no | no | ++ | no | no |
| 14 | +++ | ++ | +++ | +++ | no | no | ++ | no | no |

TABLE 4-continued

| | 15-25° C. | | | 25° C. | | | 28° C. | | |
|---|---|---|---|---|---|---|---|---|---|
| Weeks | sample 1 | sample 2 | sample 3 | sample 1 | sample 2 | sample 3 | sample 1 | sample 2 | sample 3 |
| 16 | ++++ | +++ | ++++ | +++ | no | +/− | ++ | no | no |
| 18 | ++++ | ++++ | ++++ | +++ | no | + | ++ | no | no |
| 20 | ++++ | ++++ | ++++ | +++ | no | + | ++ | no | no |

Example 4

The samples of example 3 were used to prepare a filling containing a high amount of liquid oil, originating from hazelnut paste. The recipe of the filling is given in table 5.

TABLE 5

| Filling Recipe | % |
|---|---|
| Fat | 23 |
| Sugar | 40 |
| Cocoa Mass | 5 |
| Hazelnut paste | 25 |
| Skimmed milk powder | 6.6 |
| Lecithine | 0.4 |
| Vanilline | 0.05 |

The fillings were prepared as follows: all ingredients, except the fat were mixed and roll refined. Thereafter, the mixture was further homogenised with the molten fat in a mixer with heated jacket at a temperature of 40° C. After homogenisation the mass was cooled to 35° C. and poured into aluminium cups with a diameter of 28 mm and a height of 20 mm. The thus obtained fillings were cooled for 30' at 5° C., followed by 30' at 15° C.

The fillings were then stored at 20° C. and weekly checked on the appearance of crystals at the surface, which would indicate migration of a fat component or re-crystallisation. The results of this test are given in table 6. In this table 6 "no" indicates no crystals at the surface, "+" means visible crystals at the surface.

From the results given in table 6 it can be concluded that samples 2 and 3 show a better resistance against migration and re-crystallisation as compared to the comparative example sample nr 1.

TABLE 6

| Week | sample 1 | sample 2 | sample 3 |
|---|---|---|---|
| 1 | no | no | no |
| 2 | no | no | no |
| 3 | no | no | no |
| 4 | no | no | no |
| 5 | no | no | no |
| 6 | + | no | no |
| 7 | + | no | no |
| 8 | + | no | no |
| 9 | + | no | no |
| 10 | + | no | no |
| 12 | + | no | no |
| 14 | + | no | no |
| 16 | + | no | no |

Example 5

A fat A was prepared by hydrogenation of the PMF of comparative example A with an IV of 42.0 and a POP-content of 40.9%, using a catalyst Pricat 9910, until a product was obtained with IV of 40.1 and a fatty acid composition as described in table 7.

A fat B was prepared by first interesterifying a palm oil followed by fractionation until a fat was obtained with IV 44.1 and a composition described in table 7 as "initial fat B", and then hydrogenating this fat, using a catalyst Pricat 9910, until a product was obtained with IV of 37.6 and a fatty acid composition as described in table 7. Initial fat B had a PPO content of 26.9 wt. %.

A coating fat sample (sample 4) was then prepared by combining 60% of fat A and 40% of fat B. This sample 4 had characteristics described in table 7. As can be seen the TFA content of sample 4 is very limited (6.69%) while the SFC-profile is steeper than for example fat sample nr 2.

The solid fat content (SFC) of sample 4 was measured at 30° C. according to IUPAC method 2.150a (non-stabilised) and IUPAC method 2.150b (stabilised). The ratio between the 2 SFC results was only 1.24, indicating that fat sample 4 can be used in applications without a tempering step being necessary.

TABLE 7

| Product | Initial fat A | Fat A | Initial fat B | Fat B | Sample 4 |
|---|---|---|---|---|---|
| IV | 42.0 | 40.1 | 44.1 | 37.6 | 39.1 |
| FAC | | | | | |
| C12 | 0.26 | 0.33 | 0.44 | 0.38 | 0.35 |
| C14 | 1.01 | 1.13 | 1.10 | 1.16 | 1.14 |
| C16 | 50.25 | 50.50 | 50.87 | 50.68 | 50.57 |
| C18 | 5.14 | 5.30 | 5.14 | 5.38 | 5.33 |
| C18-1 | 37.19 | 39.65 | 34.24 | 39.95 | 39.77 |
| C18-2 | 5.11 | 2.32 | 7.20 | 0.92 | 1.76 |
| C18-3 | 0.00 | 0.00 | 0.00 | 0 | 0 |
| C20 | 0.43 | 0.31 | 0.41 | 0.41 | 0.35 |
| TFA | 0.71 | 6.58 | 0.91 | 6.86 | 6.69 |
| SFA | 57.21 | 57.57 | 57.96 | 58.00 | 57.74 |
| TFA + SFA | 57.92 | 64.15 | 58.87 | 64.85 | 64.43 |
| Triglycerides | | | | | |
| S2U | 69.51 | | 59.77 | | |
| SU2 + U3 | 18.57 | | 23.00 | | |
| S3 | 1.29 | | 6.97 | | |
| Diglycerides | 8.85 | | 5.39 | | |
| SFC | | | | | |
| 10° C. | | | | | 88.4 |
| 15° C. | | | | | 79.5 |
| 20° C. | | | | | 67.6 |
| 25° C. | | | | | 46.5 |
| 30° C. | | | | | 24.4 |
| 35° C. | | | | | 10.9 |
| Crystallisation rate at 15° C. | | | | | |
| 2.5' | | | | | 26.1% |
| 5' | | | | | 41.0% |
| 7.5' | | | | | 53.8% |
| 10' | | | | | 63.2% |
| 15' | | | | | 76.0% |

Example 6

A confectionery coating was prepared with fat nr 4, according to the recipe in table 3, using the same procedure as described in example 3.

Also here we added 1% of sorbitan tristearate to the fat.

Tablets were stored for 1 week at 20° C. and then evaluated. The tablets were glossy and had good eating properties, meaning nice melting in the mouth without leaving a feeling of waxiness.

Example 7

Palm oil was first random interesterified, followed by dry fractionation at 35° C. into a stearin and olein fraction, which olein fraction was again fractionated at 17° C. into a second stearin and second olein. The characteristics of this second olein are summarised in table 8. The thus obtained olein was then hydrogenated with a catalyst type Pricat 9908 and a fat was obtained, indicated as sample 5 in table 8.

Example 8

A confectionery coating fat was prepared by blending (1) 75 parts by weight of fat sample 5 and (2) 25 parts by weight of a hard palm mid fraction with an IV of 34.5. The characteristics of this coating fat are given in table 9 as fat nr 7.

TABLE 8

| Product | 2nd olein | Nr 5 | Comp Nr 6 |
|---|---|---|---|
| FAC | | | |
| C12 | 0.82 | 0.87 | 0.25 |
| C14 | 1.09 | 1.17 | 0.29 |
| C16 | 28.82 | 29.04 | 14.43 |
| C18 | 3.55 | 4.45 | 7.91 |
| C18-1 | 50.71 | 63.11 | 74.73 |
| C18-2 | 13.66 | 0.55 | 1.53 |
| C18-3 | 0.16 | 0 | 0 |
| C20 | 0.4 | 0.31 | 0.38 |
| Triglycerides | | | |
| S2U | 26.7 | | |
| SU2 + U3 | 63.4 | | |
| S3 | 0.1 | | |
| Diglycerides | 8.7 | | |
| SFC | | | |
| 10° C. | | 92.2 | 88.6 |
| 20° C. | | 68.2 | 66.6 |
| 25° C. | | 52.3 | 48 |
| 30° C. | | 28.6 | 25.7 |
| 35° C. | | 6.7 | 5.1 |

TABLE 9

| Product | Nr 7 | Comp Nr 8 |
|---|---|---|
| FAC | | |
| C12 | 0.71 | 0.25 |
| C14 | 1.08 | 0.45 |
| C16 | 35.58 | 24.63 |
| C18 | 4.99 | 7.58 |
| C18-1 | 55.65 | 64.37 |
| C18-2 | 1.18 | 1.92 |
| C18-3 | 0 | 0 |
| C20 | 0.35 | 0.4 |

TABLE 9-continued

| Product | Nr 7 | Comp Nr 8 |
|---|---|---|
| SFC | | |
| 10° C. | 93.0 | 91.6 |
| 20° C. | 68.0 | 65.4 |
| 25° C. | 46.0 | 40.9 |
| 30° C. | 20.9 | 16.8 |
| 35° C. | 2.8 | 1.2 |

Comparative Example B

A fat was prepared by blending an amount of a soybeanoil which had been hydrogenated in the presence of a hydrogenation catalyst, type Pricat 9908, with an amount of a hydrogenated double fractionated palmolein, which had also been hydrogenated in the presence of a catalyst, type Pricat 9908. The fat thus obtained had an IV of 70.7. Characteristics of the fat are given in table 8 indicated as fat "Comp. Nr 6".

A confectionery coating fat was prepared by blending (1) 75 parts by weight of the fat composition of sample Comp. Nr 6 and (2) 25 parts by weight of a hard palm mid fraction with an IV of 34.5. The characteristics of this coating fat are given in table 9 as fat Comp nr 8.

Example 9

Coatings were prepared according to recipe in table 3, and according to the procedure described in example 3, with fat nr 7 and Comp nr 8. The products were stored for 1 week at 20° C. to stabilise and then put in incubators at 20 and 25° C. for storage tests. A score was given to the gloss of the tablets after several weeks storage. The results are given in table 10.

TABLE 10

| | 20° C. | | 25° C. | |
|---|---|---|---|---|
| Weeks | nr 7 | Comp nr 8 | nr 7 | Comp nr 8 |
| 1 | OK | OK | OK | ± |
| 2 | OK | OK | OK | – – |
| 3 | OK | OK | OK | – – |
| 4 | OK | OK | OK | – – – |
| 5 | OK | OK | OK | – – – |
| 6 | OK | OK | OK | – – – | score for gloss goes from OK to – – –, the latter meaning complete loss of gloss As can be seen from these results, the products made with the fat produced according to the process of this invention, gives clearly a better performance than the comparative fat. The coatings were also tasted by a taste panel: a slight, but not significant preference was given to sample nr 7, meaning that taste wise both products were equivalent.

The invention claimed is:

1. A process for the production of a fat composition, suitable for use as a confectionery fat, characterised in that a starting fat composition which contains between 20 and 95 wt. % of $S_2U$
less than 75 wt. % of $SU_2+U_3$
less than 20 wt. % of $S_3$
between 1 and 12 wt. % of diglycerides,
in which the glyceride contents are expressed as wt. % with respect to the total amount of di- and triglycerides, in which S means a saturated fatty acid with a hydrocarbon chain length of 14-24 carbon atoms, U means unsaturated fatty acid with a hydrocarbon chain length of 14-24 carbon atoms, which starting fat composition further contains between 10 and 100 wt. % of at least one interesterified fat, the interesterified fat containing less than 15 wt. % of C-12 with respect to the total amount of interesterified fat, said process comprising subjecting said starting fat to a catalytic hydrogenation so as to obtain a first fat and then incorporating the first fat into a fat composition.

2. A process as claimed in claim 1, characterised in that the starting fat composition contains between 20 and 80 wt. % of an interesterified fat.

3. A process as claimed in claim 1, characterised in that the starting fat composition is subjected to a partial hydrogenation.

4. A process as claimed in claim 1, characterised in that the starting fat composition is subjected to a catalytic hydrogenation so as to obtain a first fat with a trans fatty acid content of less than 25 wt. %.

5. A process as claimed in claim 1, characterised in that the starting fat composition has the following triglyceride composition:

A $S_2U$ content which is at least 30 wt,
A $S_2U$ content which is less than 95 wt. %,
A $SU_2+U_3$ content of below 60 wt. %,
A $S_3$ content of below 20 wt. %, and in that the starting fat composition has a diglyceride content between 3 and 12 wt. %.

6. A process as claimed in claim 1, characterised in that the fat composition is a vegetable fat composition.

7. A process as claimed in claim 1, characterised in that the starting fat composition comprises palm oil or a fraction thereof.

8. A process as claimed in claim 1, characterised in that the interesterified fat contains less than 10 wt. %, of C-12 fatty acids.

9. A process as claimed in claim 1, characterised in that after the interesterified fat contains interesterified palm oil or an interesterified palm oil fraction or a mixture thereof.

10. A process as claimed in claim 1, characterised in that after termination of the hydrogenation reaction, the first fat is subjected to a fractionation process.

11. A process as claimed in claim 1, characterised in that the interesterified fat contains between 10 and 100 wt. % with respect to the total amount of interesterified fat, of at least one fractionated interesterified fat.

12. A process as claimed in claim 11, characterized in that the first fat after hydrogenation contains less than 8 wt. % of trans fatty acids.

13. A process as claimed in 11, characterised in that the amount of first fat incorporated in the fat composition is chosen such that the fat composition has a trans fatty acid content of less than 8 wt. %.

14. A process as claimed in claim 1, characterised in that the fat composition is a mixture containing 10-100 wt. % of the first fat and 90-0 wt. % of a second fat the second fat having a C12 fatty acid content of less than 5 wt. %.

15. A process as claimed in claim 14, characterised in that the second fat contains an amount of at least one hydrogenated or interesterified fat.

16. A process as claimed in claim 14, characterised in that in that the second fat contains less than 15 wt. %, of trans fatty acids.

17. A process as claimed in claim 14, characterised in that the second fat contains at least 70% wt. of one or a mixture of two or more fats selected from the group of palm oil, one or more palm oil fractions, interesterified palm oil, interesterified palm oil fractions, one or more fractions of the aforementioned fats.

18. A fat composition obtainable with the method of claim 1, characterised in that the composition has an SFC at 20° C. of at least 35 wt. %.

19. A fat composition as claimed in claim 18, characterised in that the fat composition is a non temper fat.

20. A fat composition as claimed in claim 18, characterised in that the fat composition contains 10-100 wt. % of the first fat and 90-0 wt. % of a second fat, the second fat having a C-12 fatty acid content of less than 5 wt. %.

21. A fat composition as claimed in claim 20, characterised in that in that the second fat contains an amount of at least one hydrogenated or interesterified fat.

22. A fat composition as claimed in claim 20, characterised in that in that the second fat contains less than 15 wt. % of trans fatty acids.

23. A fat composition as claimed in claim 20, characterised in that the second fat contains at least 70% wt. of a fat or a mixture of two or more fats selected from the group of palm oil, one or more palm oil fractions, interesterified palm oil, interesterified palm oil fractions or one or more fractions of the aforementioned fats.

24. A fat composition of claim 20, characterised in that they first fat contains less than 8 wt % of trans-fatty acids.

25. A fat composition as claimed in claim 18, characterised in that the fat composition has a crystallization time at 15° C. of less than 15 minutes, preferably less than 10 minutes to reach 50% of its SFC measured at 15° C.

26. A food product containing the fat composition obtainable with the process of claim 1.

27. The food product as claimed in claim 26, wherein the food product is a confectionery product.

28. A food product as claimed in claim 27, characterised in that the confectionery product is selected from the group of a filling, a cream, a hard center or caramel.

29. A food product as claimed in claim 27, characterised in that the confectionery product is a coating or tablet.

* * * * *